United States Patent [19]

Koyata et al.

[11] Patent Number: 5,223,036
[45] Date of Patent: Jun. 29, 1993

[54] ADDITIVE COMPOSITION FOR CEMENT ADMIXTURE

[75] Inventors: Hideo Koyata; Tomoyuki Tsutsumi, both of Kanagawa, Japan

[73] Assignee: W. R. Grace & Co.-Conn., New York, N.Y.

[21] Appl. No.: 804,874

[22] Filed: Dec. 6, 1991

[30] Foreign Application Priority Data

Dec. 12, 1990 [JP] Japan .................................. 2-401749

[51] Int. Cl.$^5$ ............................................. C04B 24/04
[52] U.S. Cl. .................................... 106/724; 106/728; 106/802; 106/810; 106/822; 106/823; 536/18.3
[58] Field of Search ............... 106/724, 728, 802, 810, 106/822, 823; 526/271, 318.3; 525/327.8; 536/18.3

[56] References Cited

U.S. PATENT DOCUMENTS

| | | | |
|---|---|---|---|
| 2,965,678 | 12/1960 | Sundberg et al. | 106/823 |
| 4,284,433 | 8/1981 | Aignesberger et al. | 106/725 |
| 4,906,298 | 3/1990 | Natsuume et al. | 106/727 |
| 4,946,904 | 8/1990 | Akimoto et al. | 106/823 |
| 5,142,036 | 8/1992 | Akimoto et al. | 106/823 |

FOREIGN PATENT DOCUMENTS

| | | |
|---|---|---|
| 0291073 | 5/1988 | European Pat. Off. |
| 54-139929 | 10/1979 | Japan . |
| 60-016851 | 1/1985 | Japan . |
| 1-297411 | 11/1989 | Japan . |

OTHER PUBLICATIONS

Chem. Abstracts, vol. 102, No. 6, p. 270, Item 50113J.
Chem. Abstracts, vol. 106, No. 8, p. 303, Item 54900U.
Chem. Abstracts, vol. 107, No. 12, p. 323, Item 101703Q.
Chem. Abstracts, vol. 109, No. 26, p. 315, Item 235926Q.

Primary Examiner—Mark L. Bell
Assistant Examiner—Anthony J. Green
Attorney, Agent, or Firm—Howard J. Troffkin

[57] ABSTRACT

A cement admixture is disclosed which is capable of inhibiting slump loss without set retardation to hydraulic cement compositions. The admixture is composed of a mixture comprising a copolymer of maleic anhydride and an oxyalkylene containing monomer, lignosulfonic acid or its salts and an anionic surfactant.

17 Claims, No Drawings

ADDITIVE COMPOSITION FOR CEMENT ADMIXTURE

BACKGROUND OF THE INVENTION

The present invention relates to a cement admixture for hydraulic cement-based compositions. More particularly, it relates to admixtures for cement-based compositions which drastically improves the workability of concrete, mortar or paste by preventing the decrease in workability with the progression time when the unit amount of water in such a cement admixture is reduced.

Cement compositions, such as mortar or concrete, lose their fluidity with the progression of time due to the hydration reaction of cement and water. This loss reduces its workability. This phenomenon is commonly known as "slump loss". Various proposals have been made to solve this problem.

Some proposals for reducing slump loss are, for example, the addition of a set-retarding agent to fluidized concrete, the use of a granular fluidizing agent, such as beta-naphthalene sulfonate-formaldehyde condensate (β-NSF) [Japanese Patent Publication Kokai No. 139929/1979] and the use of slow-releasing chemical agents [Japanese Patent Publication (Kokai) No. 16851/1985]. However, these methods have poor effect on the prevention of slump loss or have practical problems and, accordingly, they are not effective methods.

Thus, when a set-retarding agent, such as a hydroxycarboxylic acid, is added to a cement-based composition to prevent chemical curing, it is difficult to prevent physical aggregation of the components even if the hydration reaction of cement is delayed. Thus, slump loss may not be prevented. Further, when one uses an amount of the set-retarding agent which does not cause delay of the effect, it cannot cope sufficiently with the situation. In the case where granular fluidizing agent, such as β-NSF, is used, it may show some degrees of the slump loss preventing effect, but the granular agent may not be well distributed within the cement composition and, thereby, remains locally and lowers the strength and durability of the final product. In the case where a slow-releasing chemical agent, such as a water-insoluble copolymer of an olefin and an ethylenically unsaturated dicarboxylic anhydride, is used, it may provide the slump loss preventing effect, but the cement causes the water-insoluble copolymer to precipitate. Such agents are not easily handled and lack storage stability.

In addition to the above, the economics of the cement industry dictates that the components used, including admixtures, be cost-effective.

It is highly desired to have an easily handled, cost effective agent which can inhibit slump loss in cement-based compositions. The present invention, described in detail herein below, provides an admixture for cement compositions which solves the problems described above.

SUMMARY OF THE INVENTION

The present invention is directed to an admixture for cement-based compositions which comprises:
a copolymer represented by the formula

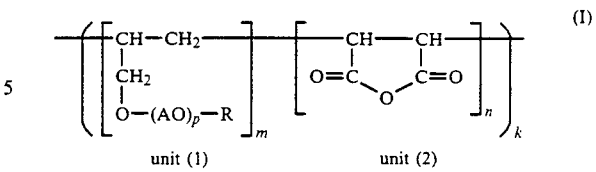

wherein
R represents a $C_{1-40}$ hydrocarbon group;
AO represents a $C_{2-18}$ oxyalkylene group or mixtures thereof;
p represents an average molar number of said oxyalkylene group having a number of from 1 to 200;
m and n are each independently an integer of from 1 to 3;
k is an integer of from 1 to 100; and wherein each monomeric unit (1) and unit (2) may be linked in blocks or at random,
its hydrolyzed product or a salt of the hydrolyzed product, as component (a);

(b) a lignosulfonic acid or its salt, as component (b), in an amount such that the weight ratio of component (a) to component (b) is from 1:99 to 50:50; and (c) 0.1 to 50 parts by weight, based on 100 parts by weight of the total amount of component (a) and (b), of at least one anionic surfactant, as component (c).

DETAILED DESCRIPTION

The present invention is directed to an admixture composition which has been unexpectedly found to provide an inhibition of slump loss to cement-based compositions (concrete, mortar or pastes), especially those used in the construction industry.

The present admixture composition provides the above desired properties without imparting a significant delay in the curing of the cement (little or no set retardation) and without causing an adverse effect on the mechanical strength (e.g. compressive strength) of the cured cement composition. All of these effects are attained in an economical, cost-effective manner.

The subject admixture composition is a mixture which requires three components comprising
(a) a copolymer represented by the formula:

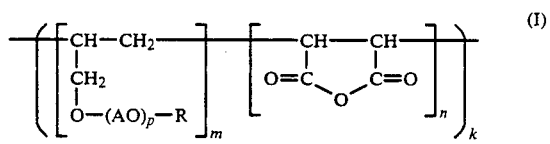

wherein
R represents $C_1$–$C_{40}$ hydrocarbon group which may be chosen from alkyl, cycloalkyl, aryl, alkaryl or aralkyl;
AO represents a $C_2$–$C_{18}$ oxyalkylene group or mixtures thereof in which 0 represents an oxygen atom and A represents an alkylene group;
p represents an average molar number of the AO groups present and is a number of from 1 to 200;
n and m are each independently an integer of from 1 to 3;
k is an integer of from 1 to 100; and
wherein the monomeric units forming said copolymer may be linked in blocks or at random.

The component (a) can be present in the form of the anydride, or a partially or completely hydrolyzed product or as a salt of the hydrolyzed product.

Exemplary $C_{2-18}$ oxyalkylene groups represented by AO in the above described formula (I) include oxyethylene, oxypropylene, oxybutylene, oxytetramethylene, oxydodecylene, oxytetradecylene, oxyhexadecylene and, oxyoctadecylene and the like. The preferred oxyalkylene groups are $C_{2-4}$ oxyalkylenes such as oxyethylene, oxypropylene or oxybutylene. The AO may include two or more types of oxyalkylene moieties and such oxyalkylene moieties may be linked in blocks or at random.

Examples of the $C_1$-$C_{40}$ hydrocarbon group represented by R in the above described formula (I) include methyl, ethyl, propyl, isopropyl, butyl, isobutyl, tertiary butyl, amyl, isoamyl, hexyl, heptyl, 2-ethylhexyl, octyl, nonyl, decyl, undecyl, dodectyl, isotridodecyl, tetradecyl, hexadecyl, isohexadecyl, isotridodecyl, tetradecyl, oleyl, octyldodecyl, decyltetradecyl, benzyl, cresyl, butylphenyl, dibutylphenyl, octylphenyl, nonylphenyl, dodecylphenyl, dioctylphenyl, dinonylphenyl, naphthyl and styrenated phenyl groups and the like.

The number average molecular weight of the copolymer which can be employed in the present invention is not particularly limited. The number average molecular weight is preferably 1,000 to 200,000.

The hydrolyzed product is a product having a hydrolyzed maleic acid unit resulting from the hydrolysis of the maleic anhydride unit in the copolymer.

The salt of the hydrolyzed product of the copolymer is a salt formed by the maleic acid unit. Exemplary salts include alkali metal salts and alkaline earth metal salts such as lithium salts, sodium salts, potassium salts, magnesium salts and calcium salts; ammonium salts; and organic amine salts such as methylamine salts, ethylamine salts, ethylenediamine salts, tetramethylenediamine salts, monoethanolamine salts, diethanolamine salts. The preferred salts are those of sodium, potassium or calcium.

The copolymer represented by formula (I) can be prepared by the method described in Japanese Patent Publication (Kokai) No. 297411/89. More specifically, the copolymer can be prepared by the bulk or suspension polymerization of an alkenyl ether represented by the formula

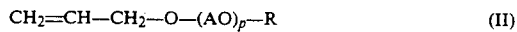

$$CH_2=CH-CH_2-O-(AO)_p-R \quad (II)$$

wherein A, R and p are the same as defined in formula (I) and maleic anhydride. If desired, the subject copolymer may contain together a small amount of another monomer which is copolymerizable therewith such as styrene, an alpha-olefin or vinyl acetate. These should be present in amounts of up to 3 wt. percent, preferably 1 wt. percent of the polymer I. The polymerization is conducted in the presence of a polymerization initiator such as an organic peroxide or an azo compound.

The second component of the subject admixture is lignosulfonic acid or its alkali or alkaline earth metal salts or mixtures thereof. This component must be used in combination with the copolymer described above to achieve the desired result. Lignosulfonates have been used as a water-reducing admixture but is known to exhibit the undesired effect of set retardation and mechanical strength loss. These effects are substantially alleviated by the present admixture.

Although there is no particular restriction on the lignosulfonic acid or its salts which are suitable as a component of the present invention, purified products obtained after removal of lower molecular weight substances or sugars by ultrafiltration are preferred.

The preferred salts of lignosulfonic acid are of the alkali metals and alkaline earth metals of lithium, sodium, potassium, magnesium and calcium.

The third component required in forming the subject admixture is at least one anionic surfactant. Although there is no particular restriction on the anionic surfactant to be used in the additive composition of the present invention, hydroxycarboxylic acids or their salts are preferred. Exemplary hydroxycarboxylic acids and their salts include gluconic acid, glucoheptonic acid, citric acid, malic acid, tartaric acid and their alkali metal and alkaline earth metal salts such as those of lithium, sodium, potassium, magnesium and calcium.

Components (a), (b) and (c) may be employed in the additive composition of the present invention in a wide variety of ratios. However, in order to decrease slump loss and reduce set retardation, it is preferred that the weight ratio of component (a) to component (b) should be from 1:99 to 50:50, preferably from 3:97 to 30:70. When components (a) and (b) are used in ratios outside of this range, the combination of desired effects is not attained. It is also preferred that the amount of component (c) should be present in from 0.1 to 50 parts by weight based on 100 parts by weight of the total amount of component (a) and component (b) of the admixture. A more preferred amount of component (c) is 2 to 20 parts by weight based on the total amount of component (a) and component (b). When amounts of greater than 50 parts by weight is used, set retardation is exhibited.

The amount of the subject admixture composition which may be employed to provide the desired effects of the present invention is typically 0.05-5 parts by weight, preferably 0.2-1 part by weight of admixture based on 100 parts by weight of cement of the cement-based composition being treated.

Conventional cement additives, such as air entrainers, water proofing agents, strength enhancers, antifoaming agents and curing accelerators can be used with the subject admixture. These additives can be mixed with the cement composition prior to, along with or subsequent to the addition of the present admixture.

The admixture composition of the present invention can be used for hydraulic cements, such as Portland cement, flyash cement, alumina cement, and various types of mixed cement and water-curable materials other than cement, such as gypsum. The admixture of the present invention, for example, can be dissolved in the blending water for the preparation of a cement composition and then mixed or kneaded with the cement composition, or it may be added to already kneaded cement admixture. Alternately, the admixture composition can be supplied as an aqueous slurry or as a dry powder mix. When in slurry form, the solid content of the slurry may range from 1 to 40 wt percent.

It is believed, although not meant to be a limitation on the present invention, that the admixture composition of the present invention shows outstanding properties due to carboxylic acid groups, formed by hydrolysis of the copolymer with alkalis in the cement, which may adsorb on the surface of cement particles, and the formation of a hydrate layer around the polyoxyalkylene group of the copolymer extending from the main chain to enhance the dispersibility of the cement particles.

Thus, excellent dispersibility of cement particles and prevention of slump loss can be exhibited.

The admixture composition of the present invention imparts an increase in flowability to cement compositions, such as mortar or concrete, without causing any significant delay of curing and, in addition, it has an excellent ability to prevent slump loss. Accordingly, the admixture composition of the present invention can bring about a significant improvement on workability in construction works. Thus, the admixture composition of the present invention can have various applications. For example, it can be effectively used as a fluidizing agent of concrete such as ready mixed concrete, as a high performance water-reducing agent for the occasion of simultaneous addition type in plant or as a high performance water reducing agent for the production of concrete secondary products.

The following examples are submitted for illustrative purposes only and are not meant to be a limitation on the invention, as defined by the claims appended hereto. All parts and percentages are by weight unless otherwise stated.

EXAMPLES 1 TO 9 AND COMPARATIVE EXAMPLE 1 TO 12

Forty liters of concrete admixture as shown in Table 1 and the additive composition as shown in Table 2 were added in a 50 liter forced blending mixer, and they were mixed and blended for 90 seconds to prepare fludizied concrete having a slump of 18 cm and an air content of 4 to 5% by volume by using a commercial air entrainer ("AE-140D", a product of Denka-Grace K.K.) in order to attain the desired air content. After blending, the mixture was transferred into a kneading boat, turned over at a predetermined number of times every 30 minutes, and the change with a progression of time was measured for up to 60 minutes. The procedures specified in JIS A-6204 were employed to measure slump, air content, compression strength and setting time to sample test specimens for measuring compression strength. The results are shown in Table 4 for Examples 1-9 and in Table 5 for Comparative Examples 1-12.

TABLE 1

Concrete Admixture

| Cement[1] | Water[2] | Sand[3] | Gravel[4] | Ratio of Water to Cement (Weight %) | Ratio of Sand to Sand and Gravel (Weight %) |
|---|---|---|---|---|---|
| \multicolumn{4}{c}{Unit Weight (kg/m³)} | | |
| 320 | 164 | 861 | 935 | 51 | 49 |

TABLE 1-continued

Water reducing rate from plain concrete: 20%

[1]Cement: Portland Cement ("Union Cement", a product of Ube K.K.)
[2]Water: Tap Water
[3]Sand: Specific gravity: 2.53; fineness modulus: 2.83
[4]Gravel: specific gravity: 2.64, fineness modulus: 6.60

The samples of concrete were each formulated with an admixture of the subject invention having the formulations shown in Table 2 below. The copolymers used are identified in Table 3.

TABLE 2

| Example No. | Additive for Cement Admixture | Amount Added Based on Weight of Cement (weight %) |
|---|---|---|
| 1 | LS/Copolymer(1)/Na gluconate | 0.40/0.06/0.04 |
| 2 | LS/Copolymer(2)/Na gluconate | 0.40/0.07/0.04 |
| 3 | LS/Copolymer(3)/Na gluconate | 0.40/0.10/0.04 |
| 4 | LS/Copolymer(4)/Na gluconate | 0.40/0.07/0.04 |
| 5 | LS/Copolymer(5)/Na gluconate | 0.40/0.08/0.04 |
| 6 | LS/Copolymer(6)/Na gluconate | 0.40/0.07/0.04 |
| 7 | LS/Copolymer(1)/Na gluconate | 0.20/0.11/0.04 |
| 8 | LS/Copolymer(1)/Na gluconate | 0.30/0.09/0.04 |
| 9 | Ls/Copolymer(1)/Na glucoheptonate | 0.40/0.06/0.04 |
| Comparative Example No. | | |
| 1 | LS/Copolymer(1) | 0.40/0.10 |
| 2 | LS/Na gluconate | 0.40/0.11 |
| 3 | LS/Copolymer(1) | 0.30/0.12 |
| 4 | LS/Na gluconate | 0.30/0.14 |
| 5 | Copolymer(1) | 0.17 |
| 6 | Copolymer(2) | 0.20 |
| 7 | Copolymer(3) | 0.25 |
| 8 | Copolymer(4) | 0.20 |
| 9 | Copolymer(5) | 0.20 |
| 10 | Copolymer(6) | 0.20 |
| 11 | Copolymer(1)/Na gluconate | 0.14/0.04 |
| 12 | LS | 0.60 |

LS: Calcium lignosulfonate

TABLE 3

| Copolymer No. | Formula (I) | | | | | |
|---|---|---|---|---|---|---|
| | AO | p | R | m | n | k |
| (1) | $C_2H_4O$ | 11 | methyl | 1 | 1 | 30 |
| (2) | $C_2H_4O$ | 33 | methyl | 1 | 1 | 10 |
| (3) | $C_2H_4O$ | 68 | methyl | 1 | 1 | 10 |
| (4) | $(C_2H_4O)(C_3H_6O)$ (random) 1:1 | 15 | n-butyl | 1 | 1 | 20 |
| (5) | $(C_2H_4O)(C_3H_6O)$ (random) 1:4 | 3 | methyl | 1 | 1 | 40 |
| (6) | $(C_2H_4O)(C_3H_6O)$ (random) 1:2 | 10 | n-butyl | 1 | 1 | 60 |

TABLE 4

| Example No. | Immediately after mixing/blending | | After 30 minutes | | After 60 minutes | | Delay of Setting Time *1 (minutes) | Compression Strength (kg/cm²) | |
|---|---|---|---|---|---|---|---|---|---|
| | Slump (cm) | Air Content (volume %) | Slump (cm) | Air Content (volume %) | Slump (cm) | Air Content (volume %) | | One Week | Four Weeks |
| 1 | 18.6 | 4.6 | 18.2 | 4.4 | 17.8 | 4.3 | +75 | 188 | 410 |
| 2 | 18.3 | 4.3 | 17.9 | 4.0 | 17.2 | 4.1 | +70 | 182 | 408 |
| 3 | 19.0 | 4.9 | 18.6 | 4.8 | 18.2 | 4.8 | +70 | 179 | 402 |
| 4 | 18.4 | 4.5 | 17.9 | 4.3 | 17.5 | 4.1 | +70 | 185 | 408 |
| 5 | 18.2 | 4.1 | 17.5 | 3.7 | 17.2 | 3.9 | +90 | 180 | 412 |
| 6 | 18.8 | 4.8 | 18.1 | 4.8 | 17.6 | 4.4 | +75 | 177 | 409 |
| 7 | 18.6 | 4.4 | 18.0 | 4.2 | 17.0 | 3.9 | +80 | 185 | 410 |
| 8 | 19.0 | 4.1 | 18.5 | 4.4 | 17.0 | 4.0 | +75 | 188 | 414 |
| 9 | 18.5 | 4.7 | 17.7 | 4.4 | 17.2 | 4.1 | +75 | 181 | 405 |

*1: delay time starting from plain concrete.

TABLE 5

| Comparative Example No. | Immediately after mixing/blending | | After 30 minutes | | After 60 minutes | | Delay of Setting Time *1 (minutes) | Compression Strength (kg/cm²) | |
|---|---|---|---|---|---|---|---|---|---|
| | Slump (cm) | Air Content (volume %) | Slump (cm) | Air Content (volume %) | Slump (cm) | Air Content (volume %) | | One Week | Four Weeks |
| 1 | 18.8 | 4.6 | 17.1 | 4.2 | 14.5 | 4.0 | +90 | 174 | 407 |
| 2 | 18.4 | 4.8 | 16.8 | 4.6 | 12.8 | 4.1 | +160 | 176 | 407 |
| 3 | 18.2 | 4.1 | 14.8 | 4.1 | 12.0 | 3.6 | +80 | 181 | 413 |
| 4 | 18.8 | 4.4 | 13.9 | 3.9 | 12.2 | 3.8 | +210 | 171 | 409 |
| 5 | 18.5 | 4.5 | 14.8 | 4.5 | 10.6 | 4.4 | +155 | 180 | 420 |
| 6 | 18.7 | 4.6 | 14.5 | 4.2 | 9.8 | 3.9 | +90 | 181 | 411 |
| 7 | 18.1 | 4.9 | 15.5 | 4.7 | 11.0 | 5.1 | +80 | 177 | 403 |
| 8 | 18.2 | 4.5 | 15.0 | 4.1 | 12.5 | 4.2 | +90 | 179 | 415 |
| 9 | 18.6 | 4.2 | 15.2 | 4.4 | 12.2 | 3.9 | +120 | 177 | 411 |
| 10 | 18.7 | 4.3 | 15.2 | 4.3 | 13.0 | 4.5 | +100 | 183 | 415 |
| 11 | 18.2 | 4.1 | 14.8 | 3.9 | 11.6 | 4.1 | +130 | 180 | 423 |
| 12 | 18.7 | 4.6 | 16.3 | 4.1 | 12.5 | 3.9 | +110 | 172 | 423 |

*1: delay time starting from plain concrete.

What is claimed

1. A cement admixture composition which comprises:
(a) a copolymer represented by the formula

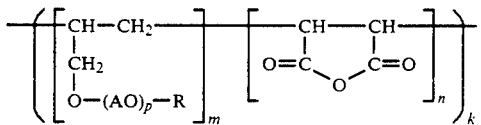  (I)

wherein
R represents a $C_{1-40}$ hydrocarbon group;
AO represents a $C_{2-18}$ oxyalkylene group or mixtures thereof;
p represents an average molar number of said oxyalkylene group having a number of from 1 to 200; and
m and n are each independently an integer of from 1 to 3;
k is an integer of from 1 to 100; and wherein each monomeric unit forming the copolymer may be linked in blocks or at random,
its hydrolyzed product or a salt of the hydrolyzed product;
(b) a lignosulfonic acid or its salt at a weight ratio of component (a) to component (b) of 1:99 to 50:50; and
(c) 0.1 to 50 parts by weight, based on 100 parts by weight of the total amount of components (a) and (b), of at least one anionic surfactant.

2. The additive composition of claim 1, wherein said anionic surfactant is a hydroxycarboxylic acid or its salt.

3. The additive composition of claim 2, wherein said hydroxycarboxylic acid is selected from the group consisting of gluconic acid, glucoheptonic acid, citric acid, malic acid, tartaric acid and their alkali and alkaline earth metal salts and mixtures thereof.

4. The admixture of claim 2 wherein the copolymer has a structure such that AO represents a $C_2$-$C_4$ oxyalkylene, R represents a $C_1$-$C_5$ alkyl or a $C_7$-$C_{15}$ alkaryl and the copolymer has a number average molecular weight of 1,000 to 200,000.

5. The admixture composition of claim 1 wherein the weight ratio of component (a) to component (b) is from 3:97 to 30:70.

6. The admixture composition of claim 4 wherein the weight ratio of component (a) to component (b) is from 3:97 to 30:70.

7. The admixture composition of claim 1 wherein said composition is an aqueous solution having from about 1 to 40 percent by weight of the admixture therein.

8. The admixture composition of claim 4 wherein said composition is an aqueous solution having from about 1 to 40 percent by weight of the admixture therein.

9. The admixture composition of claim 5 wherein said composition is an aqueous solution having from about 1 to 40 percent by weight of the admixture therein.

10. The admixture composition of claim 7 wherein the composition further comprises at least one cement additive selected from air entrainers, water proofing agents, strength enhancers, antifoaming agents and curing accelerators.

11. The admixture composition of claim 8 wherein the composition further comprises at least one cement additive selected from air entrainers, water proofing agents, strength enhancers, antifoaming agents and curing accelerators.

12. An improved hydraulic cement composition comprising a hydraulic cement and an admixture of claim 1.

13. An improved hydraulic cement composition comprising a hydraulic cement and an admixture of claim 3.

14. An improved hydraulic cement composition comprising a hydraulic cement and an admixture of claim 4.

15. An improved concrete composition comprising portland cement, sand, gravel, water, and an admixture of claim 1.

16. An improved concrete composition comprising portland cement, sand, gravel, water, and an admixture of claim 3.

17. An improved concrete composition comprising portland cement, sand, gravel, water, and an admixture of claim 4.

* * * * *